(12) United States Patent
Champeix et al.

(10) Patent No.: US 10,141,396 B2
(45) Date of Patent: Nov. 27, 2018

(54) PROTECTED ELECTRONIC CHIP

(71) Applicant: STMicroelectronics (Rousset) SAS, Rousset (FR)

(72) Inventors: Clement Champeix, Saint-Cyprien (FR); Nicolas Borrel, Martigues (FR); Alexandre Sarafianos, Trets (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 15/444,644

(22) Filed: Feb. 28, 2017

(65) Prior Publication Data
US 2018/0097058 A1    Apr. 5, 2018

(30) Foreign Application Priority Data
Sep. 30, 2016 (FR) .................. 16 59451

(51) Int. Cl.
| G06F 21/78 | (2013.01) |
| H01L 29/06 | (2006.01) |
| G06F 21/88 | (2013.01) |
| G06F 21/77 | (2013.01) |
| H01L 27/06 | (2006.01) |
| H01L 29/10 | (2006.01) |
| H03K 5/24 | (2006.01) |
| G06F 21/75 | (2013.01) |

(Continued)

(52) U.S. Cl.
CPC .......... H01L 29/0623 (2013.01); G06F 21/75 (2013.01); G06F 21/77 (2013.01); G06F 21/78 (2013.01); G06F 21/87 (2013.01); G06F 21/88 (2013.01); H01L 27/0629 (2013.01); H01L 29/1095 (2013.01); H03K 5/24 (2013.01); H01L 23/57 (2013.01); H01L 29/66181 (2013.01)

(58) Field of Classification Search
CPC ............ H01L 29/0623; H01L 27/0629; H01L 29/1095; G06F 21/77; G06F 21/78; G06F 21/86; G06F 21/88; H03K 5/24
See application file for complete search history.

(56) References Cited

U.S. PATENT DOCUMENTS 4,860,154 A * 8/1989 Fazlollahi .......... H03K 17/0826
330/207 P
7,473,958 B2 * 1/2009 Wagner ............ G06K 19/07372
257/314

(Continued)

FOREIGN PATENT DOCUMENTS

| FR | 2958078 A1 | 9/2011 |
| WO | 2004047172 A1 | 6/2004 |

OTHER PUBLICATIONS

Bar-El, H. et al., "The Sorcerer's Apprentice Guide to Fault Attacks," XP-002329915, Proceedings of the IEEE, vol. 94, Issue 2, Feb. 2006, 13 pages.

*Primary Examiner* — Jung Kim
(74) *Attorney, Agent, or Firm* — Slater Matsil, LLP

(57) ABSTRACT

An electronic chip includes a doped semiconductor substrate of a first conductivity type, a doped buried layer of a second conductivity type overlying the substrate, and a first doped well of the first conductivity type overlying the buried layer. Circuit components can be formed at a top surface of the first doped well and separated from the buried layer. A current detector is coupled to the buried layer and configured detect a bias current flowing into or out of the buried layer.

20 Claims, 3 Drawing Sheets

(51) Int. Cl.
*G06F 21/87* (2013.01)
*H01L 23/00* (2006.01)
*H01L 29/66* (2006.01)

(56) References Cited

U.S. PATENT DOCUMENTS 9,559,066 B2* 1/2017 Hindman .............. H01L 27/092
2013/0193437 A1 8/2013 Lisart et al.
2013/0314121 A1 11/2013 Mougin et al.

* cited by examiner

US 10,141,396 B2

PROTECTED ELECTRONIC CHIP

CROSS-REFERENCE TO RELATED APPLICATIONS

This application claims the priority benefit of French patent application number 1659451, filed on Sep. 30, 2016, the content of which is hereby incorporated by reference in its entirety to the maximum extent allowable by law.

TECHNICAL FIELD

The present application relates to electronic chips, for example, to electronic chips protected against attacks.

BACKGROUND

Electronic chips such as bank card chips contain confidential data likely to be coveted by pirates. To obtain this information, a pirate may carry out an attack by scanning the rear surface of the chip with laser pulses. The impact of the laser disturbs the chip operation. The observation of the consequences of such disturbances, sometimes called faults, enables the pirate to carry out the attack. To disturb the chip operation, the pirate may also apply positive or negative potentials using a probe in contact with the rear surface.

It is desirable to have electronic chips protected against this type of attack, called fault injection attack, known devices having various disadvantages and implementation issues.

SUMMARY

Thus, an embodiment provides an electronic chip that comprises a doped semiconductor substrate of a first conductivity type, a doped buried layer of a second conductivity type covering the substrate, and a first doped well of the first conductivity type covering the buried layer. Circuits separated from the buried layer are formed inside and on top of the first well and/or inside and on top of second wells formed in the first well. A detector of the current is used for biasing the buried layer.

According to an embodiment, a first wall of the second conductivity type in contact with the buried layer surrounds the first well.

According to an embodiment, a second wall of the first conductivity type in contact with the substrate surrounds the first wall.

According to an embodiment, between the buried layer and the second wells, the first well has a thickness in the range from 2 to 3 µm.

According to an embodiment, the buried layer has a thickness in the range from 2 and 3 µm.

According to an embodiment, the detector is capable of generating an alert signal when the bias current is, in absolute value, greater than a value in the range from 2 to 50 µA.

An embodiment provides a method of protecting the above chip against an attack, comprising: biasing the substrate and the first well to a reference potential; biasing the buried layer to block the junction between the buried layer and the substrate and the junction between the buried layer and the first well; and generating an alert signal if the current for biasing the buried layer is greater than a threshold, the alert signal triggering counter-measures to stop the attack.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
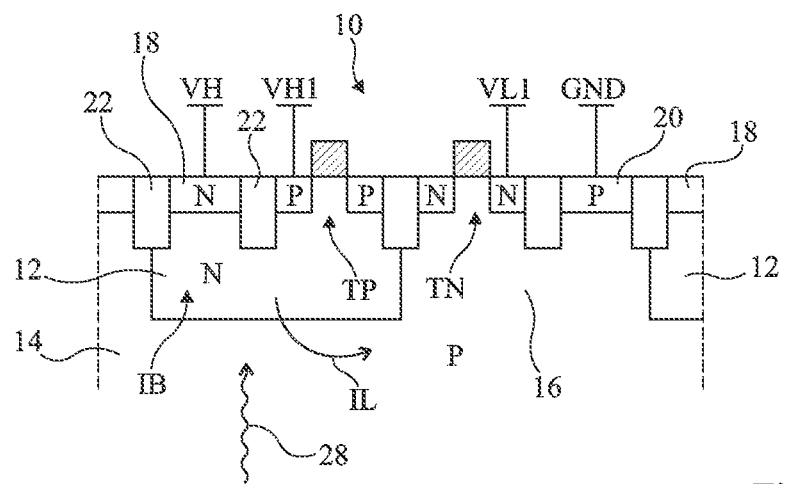
FIGS. 1 and 2 are partial simplified cross-section views illustrating different types of electronic chip circuit.

The same elements have been designated with the same reference numerals in the various drawings and, further, the various drawings are not to scale. For clarity, only those steps and elements which are useful to the understanding of the described embodiments have been shown and are detailed. In particular, details of analog or digital circuits and of memory circuits are not shown.

In the following description, when reference is made to terms qualifying the relative position, such as terms "top", "bottom", "upper", "lower", etc., reference is made to the orientation of the concerned elements in the concerned cross-section views.

FIG. 1 is a cross-section view illustrating an example of a circuit 10 of a first type, called double well circuit, comprised in an electronic chip. Circuit 10 comprises P-channel MOS transistors TP and N-channel MOS transistors TN. Transistors TP are formed inside and on top of N-type doped wells 12 located in the front surface of a P-type doped substrate 14. Transistors TN are formed inside and on top of portions 16 of the substrate located between N wells 12. N wells 12 are provided with bias contacts 18 at the front surface. Contacts 18 are connected to a node of application of a high potential VH. Portions 16 are provided with bias contacts 20 at the front surface connected to a ground GND. Transistors TP and TN are connected, by conductors, not shown, to form circuits powered between high and low potentials VH1 and VL1. Power supply potentials VH1 and VL1 may be respectively equal to bias potentials VH and GND. Transistors TN, TP and bias contacts 18 and 20 are separated from one another by insulating trenches 22.

Figure 2:
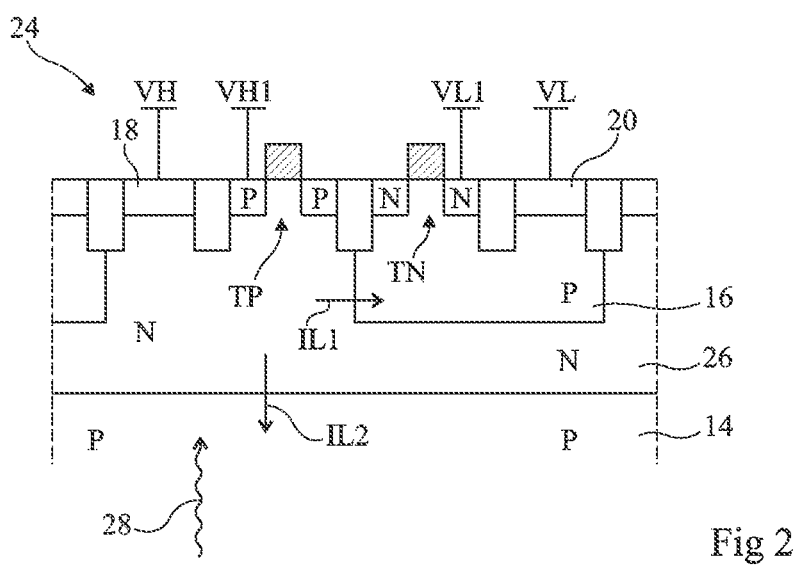

FIG. 2 is a cross-section view illustrating an example of a circuit 24 of a second type, called triple well circuit, comprised in an electronic chip. Circuit 24 comprises elements of circuit 10 which will not be described again. In circuit 24, N wells 12 are gathered in a deep well 26 having P wells 16 formed therein, and the bias contacts 20 of P wells 16 are connected to a node of application of a low potential VL which may be different from ground GND.

As indicated as a preamble, the circuits of a chip may contain confidential information coveted by a pirate. The pirate is likely to attempt obtaining this information by a fault injection attack. To achieve this, the pirate may first observe different circuits of the chip from the rear surface with an infrared camera, and then select a circuit to be attacked.

The pirate may attack the circuit with a laser pulse 28. In the case of a circuit of double well type such as illustrated in FIG. 1, the pulse creates electron-hole pairs close to the PN junction between an N well 12 and P substrate 14. The electrons are separated by the electric field existing close to the PN junction. The electrons head towards the high potentials of N well 12 and the holes head towards the low potentials of a neighboring P portion 16. This results in a current IL which flows from N well 12 to P portion 16. The presence of electrons and of holes, respectively in well 12 and in portion 16, disturbs the operation of transistors TN and TP. In the case of a circuit of triple well type, the laser pulse creates a photocurrent IL1 from N well 26 to P well 16 and a photocurrent IL2 from N well 26 to P substrate 14, which disturbs the operation of the transistors.

The pirate may also attack the circuit by applying a potential, for example, a positive potential of several tens of volts, using a probe, not shown, applied on the rear surface. In the example of a circuit of triple well type, the PN junction between P substrate 14 and N well 26 is forward biased. A bipolar transistor formed of a P well 16, of N well 26, and of P substrate 14 has a forward-biased base-emitter junction and is thus conductive. Thereby, the pirate injects charges into N and P wells 26 and 16, which disturbs the operation of transistors TN and TP.

It is here desired to protect against such attacks circuits of double well type or of triple well type, where such circuits may be digital circuits or analog circuits. It is here also desired to protect other types of circuits, for example, circuits comprising bipolar transistors and/or other types of semiconductor components and/or of components such as capacitors or resistors. It is further desired to protect memory circuits, that is, circuits comprising an assembly of memory points, for example, an array of memory points.

Figure 3A:
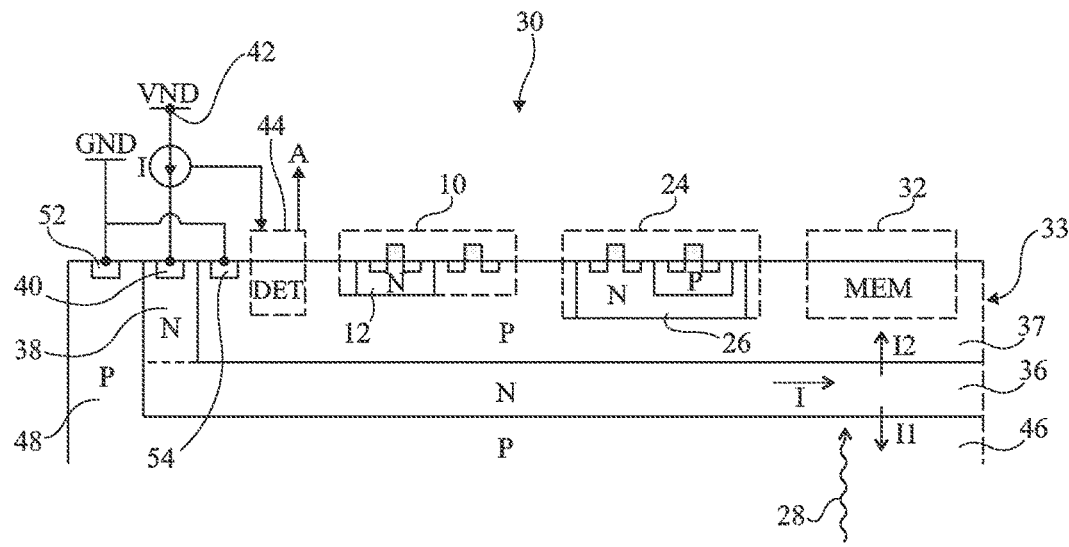
FIG. 3A is a partial simplified cross-section view of an embodiment of an electronic chip protected against attacks.
Figure 3B:
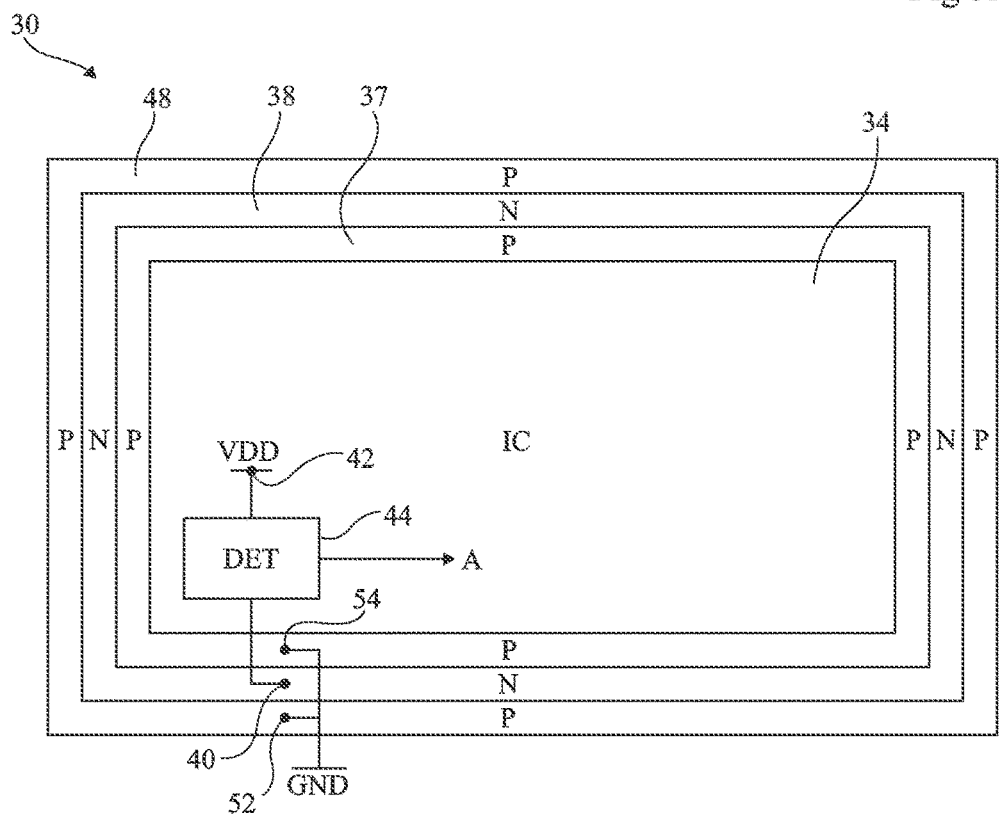
FIG. 3B is a simplified top view of the chip of FIG. 3A.

FIGS. 3A and 3B illustrate an embodiment of a chip 30 protected against fault injection attacks. FIG. 3A is a partial simplified cross-section view, and FIG. 3B is a top view at a different scale.

As an example, chip 30 comprises a circuit 10 of the type in FIG. 1, a circuit 24 of the type in FIG. 2, and a memory circuit 32 (MEM) formed at the front surface of a semiconductor wafer 33. Circuits 10, 24, and 32 illustrated in FIG. 3A are located in a protected area 34 (IC) shown in FIG. 3B where these circuits are not shown.

Chip 30 comprises an N-type doped buried layer 36 located under a P-type doped layer 37. Circuits 10, 24, and 32 are formed inside and on top of layer 37. P layer 37 is in contact with buried layer 36, while the elements of circuits 10, 24, and 32 however do not extend all the way to buried layer 36.

The periphery of N-type buried layer 36 is in contact with an N-type wall 38 which extends, from the front surface, in the portion of wafer 33 located around protected area 34. Layer 37, thus delimited by buried layer 36 and by wall 38, forms a well 37. As an example, wall 38 totally surrounds protected area 34. Wall 38 is topped with a contact 40 connected to a node 42 of application of a high bias potential VDD. Contact 40 is connected to a detector 44 (DET) of current I for biasing buried layer 36, that is, of the current absorbed by buried layer 36 or originating therefrom. The detector may be located in protected area 34.

The portion of wafer 33 located under buried layer 36 corresponds to a P-type doped substrate 46. Substrate 46 is in contact with a P-type doped peripheral wall 48 which extends all the way to the front surface.

P wall 48 is connected to ground GND by a contact 52 and P well 37 is connected to ground GND by a contact 54.

As an example, N wells 12 and 26 of circuits 10 and 24 may penetrate into P well 37 down to a depth smaller than 2 μm. The thickness of well 37 between the lower level of N wells 12 and 26 and the upper level of buried layer 36 may be in the range from 2 to 3 μm. Buried layer 36 may have a thickness in the range from 2 to 3 μm.

In normal operation, that is, in the absence of an attack, the PN junctions between buried layer 36 and the surrounding P-type doped regions 46 and 37 are reverse-biased, and bias current I of buried layer 36 is negligible.

In case of an attack by a laser beam 28 from the rear surface, a photogenerated current I1 flows from buried layer 36 to P substrate 46, and a photogenerated current I2 flows from buried layer 36 to P well 37. Bias current I of buried layer 36, which comprises the two components I1 and I2, thus increases due to the attack. When current I becomes greater than a threshold, the detector emits an alert signal A. The generation of this alert signal results in that countermeasures are taken to stop the attack, for example, by destroying the confidential data or by stopping the circuit operation.

Attacks by application of a positive or negative potential are similarly detected and stopped by a probe on the rear surface of the chip. As an example, the detected current threshold is, in absolute value, in the range from 2 to 50 μA, for example, 10 μA.

According to an advantage, due to the presence of N buried layer 36, any type of circuit formed in the upper portion of well 37 can be protected, and several circuits of different types can be simultaneously protected. In the shown example, a circuit of double well type, a circuit of triple well type, and a memory circuit are protected. All the circuits of a chip can thus be simultaneously protected.

According to another advantage, P well 37, N wall 38, and P wall 48 occupy at the front surface around protected area 34 a strip of small width, for example, narrower than 4 μm. The surface of the chip dedicated to the protection is limited to this strip and to the surface of a single detector common to the circuits, while protected area 34 may have a surface area greater than 1 mm². The surface area of the chip used to protect the circuits is thereby particularly limited.

According to another advantage, the detection sensitivity is particularly high. Indeed, due to the presence of P well 37, the bias current generated by the attack is not mixed with the power supply currents of the circuits or with the bias currents of the wells comprised in the circuits.

According to another advantage, due to the presence of N-type buried layer 36 sandwiched between P regions under all the circuits of protected area 34, the circuit wells are not visible by infrared imaging. This enables to avoid for the pirate to be able to easily select the locations to be attacked.

According to another advantage, the presence of N wall 38 separated from the circuits surrounding protected area 34 enables to efficiently protect the circuit portions located at the periphery of a protected area.

Figure 4:
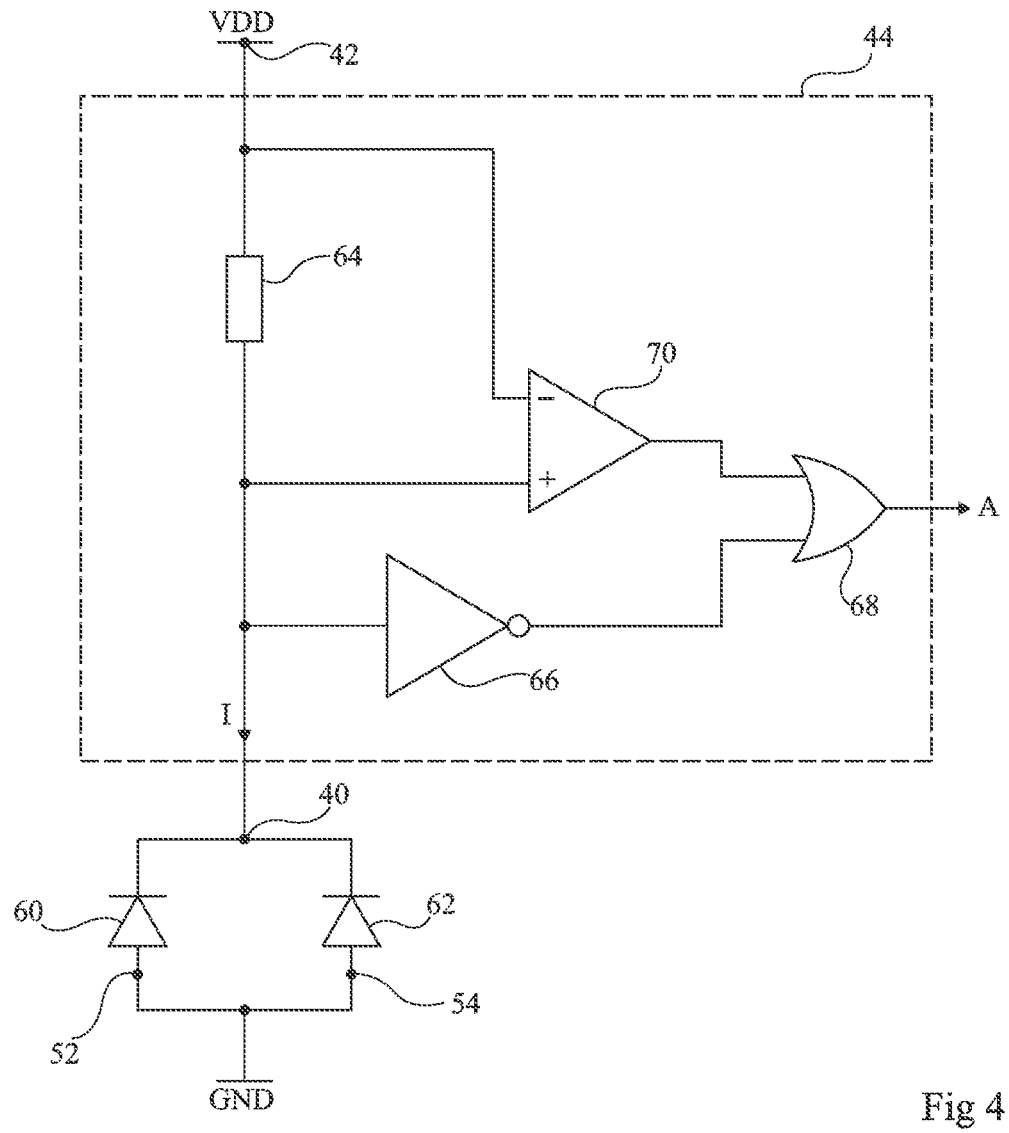
FIG. 4 illustrates an embodiment of an attack detector.

FIG. 4 illustrates an example of a detector 44 capable of detecting a current flowing into or out of buried layer 36. Detector 44 is connected to the node of application of potential VDD and to contact 40 of wall 38 connected to buried layer 36. The PN junction between substrate 46 connected to contact 52 has been represented by a diode 60 and the PN junction between P well 37 connected to contact 54 and buried layer 36 has been represented by a diode 62.

Detector 44 comprises a resistor 64 connecting contact 40 to node 42 of application of potential VDD. Contact 40 is coupled by an inverter 66 to a first input of an OR gate 68. A comparator 70 is connected across resistor 64, the positive input of comparator 70 being connected to contact 40 and the negative input being at voltage VDD. The output of comparator 70 is connected to a second input of OR gate 68. Alert signal A corresponds to a high value of the output of OR gate 68.

In normal operation, contact 40 is taken to potential VDD through resistor 64. No alert signal is emitted.

In case of a laser attack causing the absorption of a current I by the buried layer, the potential of contact 40 drops and the output of inverter 66 switches to the high value, which causes the emission of alert signal A. Similarly, an attack by application of a high negative potential on the rear surface is similarly detected.

In case of an attack by application of a positive potential to the rear surface, a current originating from node 40 causes an increase in the potential of contact 40, and this potential becomes greater than potential VDD. When the potential of contact 40 exceeds a threshold value, the output of comparator 70 switches to the high value, which causes the emission of alert signal A.

According to an advantage, the detector thus obtained contains a small number of components and is easy to implement. This detector occupies a limited surface area on the chip. Further, this detector provides a protection both against laser attacks and against attacks by application of a potential.

Specific embodiments have been described. Various alterations, modifications, and improvements will readily occur to those skilled in the art. In particular, although a resistor 64 enabling to apply bias potential VDD to contact 40 has been described in relation with FIG. 4, resistor 64 may be replaced with a circuit of application of potential VDD, this circuit supplying a current $I_{TH}$ flowing to contact 40 when contact potential 40 is lower than potential VDD, and opposing a resistance to the flowing of current from contact 40 when the potential of contact 40 is higher than voltage VDD. The value of current $I_{TH}$ then corresponds to a threshold of detection of the bias current.

Further, although walls 38 and 48 shown in FIG. 3B completely surround protected area 34, walls 38 and 48 may be replaced with similar walls partially surrounding the protected area. Further, wall 38 may be replaced with any other structure for electrically connecting buried layer 36 to detector 44.

Further, the N and P conductivity types can be inverted by inverting the signs of the potentials.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electronic chip, comprising:
    a doped semiconductor substrate of a first conductivity type;
    a doped buried layer of a second conductivity type overlying the doped semiconductor substrate;
    a first doped well of the first conductivity type overlying the doped buried layer;
    a first wall of the second conductivity type in contact with the doped buried layer and surrounding the first doped well;
    circuit components formed at a top surface of the first doped well and separated from the doped buried layer; and
    a current detector coupled to the doped buried layer and connected between a node configured to carry a voltage potential and the first wall, the current detector configured to detect a bias current flowing into or out of the doped buried layer, wherein the current detector comprises:
        a resistor coupled between the node configured to carry the voltage potential and the first wall;
        an inverter with an input coupled to the node configured to carry the voltage potential;
        a comparator coupled across the resistor, the comparator having a positive input coupled to the first wall and a negative input coupled to the node configured to carry the voltage potential; and
        an OR gate with a first input coupled to an output of the inverter and a second input coupled to an output of the comparator.

2. The chip of claim 1, further comprising a second doped well formed in the first doped well, wherein ones of the circuit components are formed at a top surface of the second doped well.

3. The chip of claim 2, wherein, the first doped well has a thickness between 2 µm and 3 µm between the doped buried layer and the second doped well.

4. The chip of claim 1, further comprising a second wall of the first conductivity type in contact with the doped semiconductor substrate and surrounding the first wall.

5. The chip of claim 1, wherein the doped buried layer has a thickness between 2 µm and 3 µm.

6. The chip of claim 1, wherein the current detector is capable of generating an alert signal when the bias current is, in absolute value, greater than a threshold value.

7. The chip of claim 6, wherein the threshold value is between 2 µA and 50 µA.

8. The chip of claim 1, wherein the current detector is configured to generate an alert signal based on a voltage of the first wall.

9. The chip of claim 1, wherein the doped semiconductor substrate is coupled to a ground node, and the first doped well is coupled to the ground node.

10. The chip of claim 1, wherein the current detector is configured to bias the doped buried layer.

11. An electronic chip, comprising:
    a doped semiconductor substrate of a first conductivity type;
    a doped buried layer of a second conductivity type overlying the doped semiconductor substrate;
    a first doped well of the first conductivity type overlying the doped buried layer;
    a first wall of the second conductivity type in contact with the doped buried layer and surrounding the first doped well;
    circuit components formed at a top surface of the first doped well and separated from the doped buried layer; and
    means for detecting a bias current flowing into or out of the doped buried layer, wherein the means for detecting the bias current are connected between a node configured to carry a voltage potential and the first wall, and wherein the means for detecting the bias current comprises:
        a resistor coupled between the node configured to carry the voltage potential and the first wall;
        an inverter with an input coupled to the node configured to carry the voltage potential;
        a comparator coupled across the resistor, the comparator having a positive input coupled to the first wall and a negative input coupled to the node configured to carry the voltage potential; and an OR gate with a first input coupled to an output of the inverter and a second input coupled to an output of the comparator.

12. An electronic chip, comprising:
a p-type doped semiconductor substrate;
an n-type doped buried layer overlying the p-type doped semiconductor substrate;
a first p-type doped well overlying the n-type doped buried layer;
an n-type wall in contact with the n-type doped buried layer and surrounding the first p-type doped well;
a circuit component disposed at a top surface of the first p-type doped well and separated from the n-type doped buried layer; and
a current detector coupled to the n-type doped buried layer and connected between a node configured to carry a voltage potential and the n-type wall, the current detector configured to detect a bias current flowing into or out of the n-type doped buried layer, wherein the current detector comprises:
a resistor coupled between the node configured to carry the voltage potential and the n-type wall;
an inverter with an input coupled to the node configured to carry the voltage potential;
a comparator coupled across the resistor, the comparator having a positive input coupled to the n-type wall and a negative input coupled to the node configured to carry the voltage potential; and
an OR gate with a first input coupled to an output of the inverter and a second input coupled to an output of the comparator.

13. The chip of claim 12, wherein the circuit component comprises a double well circuit or a triple well circuit.

14. The chip of claim 12, further comprising a p-type wall in contact with the p-type doped semiconductor substrate and surrounding the n-type wall.

15. The chip of claim 14, wherein the first p-type doped well and the p-type wall are coupled to a ground node.

16. The chip of claim 12, wherein the comparator is configured to detect the bias current using a threshold having an absolute value between 2 uA and 50 uA.

17. The chip of claim 12, wherein the n-type doped buried layer comprises a thickness between 2 um and 3 um.

18. The chip of claim 12, wherein the circuit component comprises a memory circuit.

19. The chip of claim 18, further comprising a p-type wall in contact with the p-type doped semiconductor substrate and surrounding the n-type wall, wherein the p-type wall is coupled to a ground node.

20. The chip of claim 4, wherein the second wall is coupled to a ground node.

* * * * *